(12) United States Patent
Boyer et al.

(10) Patent No.: US 8,133,445 B2
(45) Date of Patent: Mar. 13, 2012

(54) REACTION CHAMBER PROMOTING HEAT EXCHANGE BETWEEN THE REAGENTS AND THE GASES THAT ARE PRODUCED

(75) Inventors: Christophe Boyer, Charly (FR); Fabrice Giroudiere, Orlienas (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 181 days.

(21) Appl. No.: 12/573,376

(22) Filed: Oct. 5, 2009

(65) Prior Publication Data

US 2010/0086477 A1    Apr. 8, 2010

(30) Foreign Application Priority Data

Oct. 7, 2008  (FR) ...................................... 08 05537
Oct. 20, 2008 (FR) ...................................... 08 05800

(51) Int. Cl.
*B01J 8/02*    (2006.01)
*B01J 35/02*   (2006.01)
*B01J 19/00*   (2006.01)
*F28D 7/00*    (2006.01)
*C01B 3/02*    (2006.01)

(52) U.S. Cl. ........ 422/211; 422/129; 422/200; 422/201; 422/198; 423/648.1

(58) Field of Classification Search .................. 422/129, 422/198, 200–202, 204, 211; 423/648.1
See application file for complete search history.

(56) References Cited

U.S. PATENT DOCUMENTS

| | | | |
|---|---|---|---|
| 4,767,791 A * | 8/1988 | Nakajima et al. | 518/712 |
| 4,861,347 A * | 8/1989 | Szydlowski et al. | 48/61 |
| 4,861,348 A | 8/1989 | Koyama et al. | |
| 6,835,354 B2 * | 12/2004 | Woods et al. | 422/139 |
| 2003/0041519 A1 * | 3/2003 | Maruko | 48/197 R |
| 2010/0189638 A1 * | 7/2010 | Giroudiere et al. | 423/650 |

FOREIGN PATENT DOCUMENTS

| | | |
|---|---|---|
| FR | 2914395 A1 | 10/2008 |
| GB | 2359764 A | 9/2001 |
| JP | 2071834 W | 3/1990 |
| NL | 8802129 A | 3/1989 |
| WO | 2007118950 A9 | 10/2007 |
| WO | 2008132313 A2 | 11/2008 |

OTHER PUBLICATIONS

Farnell, P.W. ED. "Advanced Gas-Heated Reformer." (Ammonia Technical Manual), Sep. 27, 1999), 173-181, 40:27.
Institut National De La Propriete Industrielle "Written Opinion." FR 0805800. Applicant: IFP. Mailed Apr. 1, 2009.

* cited by examiner

*Primary Examiner* — Walter D Griffin
*Assistant Examiner* — Natasha Young
(74) *Attorney, Agent, or Firm* — Millen, White, Zelano & Branigan, P.C.

(57) ABSTRACT

This invention relates to a chamber in which a chemical reaction is carried out in the presence of catalyst and reagents, comprising at least one catalytic tube (10) into which is placed an internal tube (12) for evacuating the gas that is produced, means for introducing reagents (15) and means for introducing the catalyst (16) that are located in the upper portion of the chamber (1), means for heating the catalytic tube (10) that are arranged in the lower portion of the chamber (1), and in which the catalytic tube (10) comprises, in its upper portion above the catalyst (13), means that promote heat exchange between the reagents and the gas that is produced. The invention also relates to the process that uses this chamber.

17 Claims, 1 Drawing Sheet

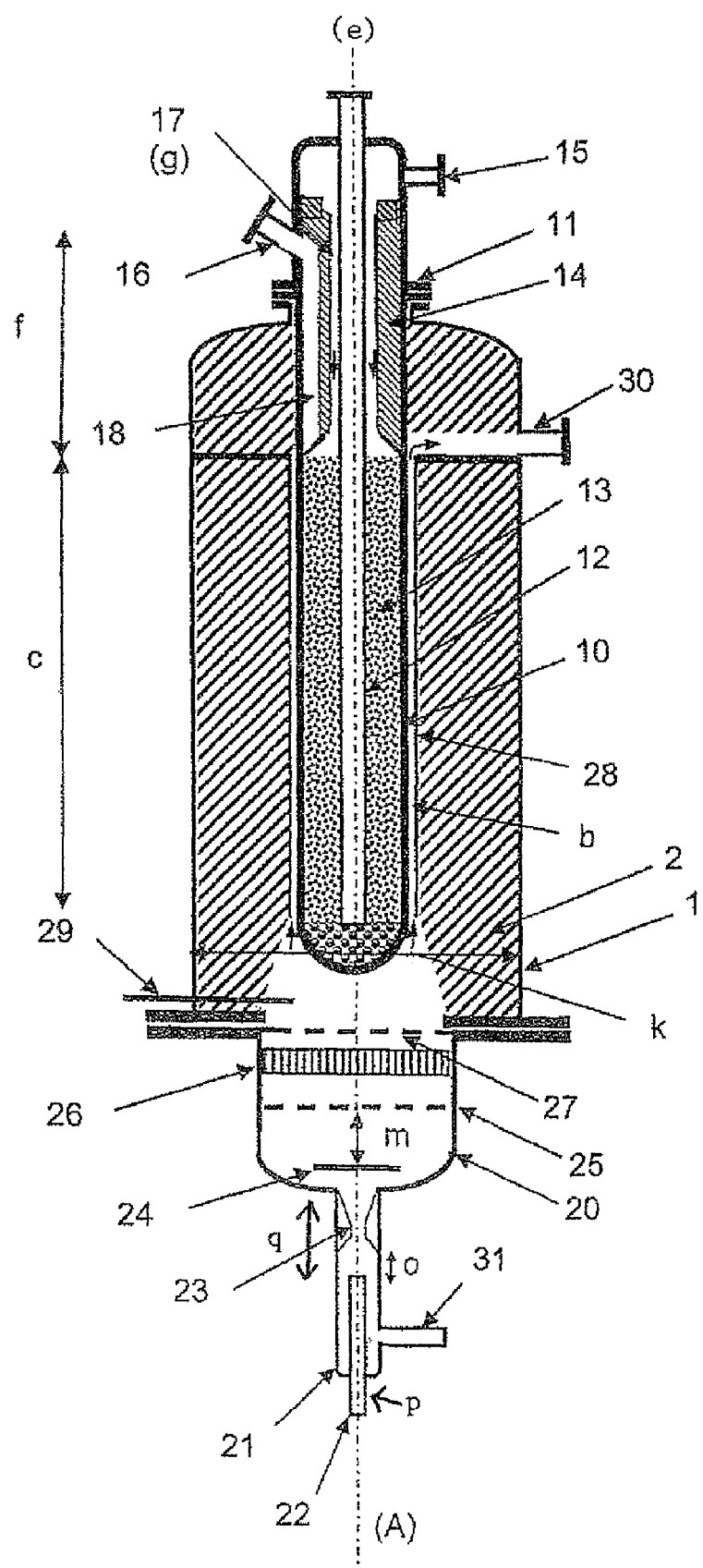

REACTION CHAMBER PROMOTING HEAT EXCHANGE BETWEEN THE REAGENTS AND THE GASES THAT ARE PRODUCED

This invention relates to the field of the production of synthesis gas formed by a mixture of hydrogen, carbon monoxide, carbon dioxide, and water, and more particularly a device of the reactor-exchanger type that makes possible the production of this synthesis gas by steam reforming.

Steam reforming is a process for the production of hydrogen in the presence of steam and heat. This is the process that is most used today at the industrial level. This process takes place in general in a reactor in the presence of a catalyst and/or burners. The energy that is necessary for the endothermic steam-reforming reaction is to be provided by heat transfer to the catalytic reaction medium. The synthesis gas is generally to be produced by pressure so as to allow its purification in downstream stages without having to recompress it.

During the production of hydrogen by steam reforming, the yield of hydrogen production and conversion of the feedstock that is used depends on the thermodynamic equilibrium of the steam-reforming reaction, which is a direct function of the outlet temperature of the catalyst. Typically, the temperature that makes it possible to maximize the yield varies between 750° C. for ethanol and 900° C. for methane. At these temperature levels, the heat losses are very high; it is therefore important to minimize them. Furthermore, whereby the reagents are pressurized and at very high temperatures, the constraints on the materials are very significant. It is very difficult, and even impossible, to enter or exit from the pressurized reactor beyond certain temperatures. For example, the outside input of very hot combustion gas cannot be done by a standard conduits because the gas is typically above 1000° C. Another constraint that it is necessary to take into consideration is the behavior of the materials under conditions of high risks of corrosion (also called metal dusting in English terminology), which occurs under a fuel atmosphere (presence of $CO$, $CO_2$), primarily when the temperatures are between 600° C. and 800° C.

Systems are already known that make it possible to take certain of these constraints into account. It is possible to cite in particular the U.S. Pat. No. 4,861,348 that proposes a bayonet-type exchanger reactor for catalytic reactions in which the catalyst is inserted between two concentric tubes and heated by the flow of gas that comes from a burner that is located in the lower portion of the reactor. A system of peripheral pipes makes it possible to preheat the combustion air by counter-current flow with the smoke from the burner and thus to arrange cold walls on the periphery of the reactor.

It is also possible to cite the patent application filed with the INPI on Jul. 20, 2007 under Number 07/05-316FR, which describes a bayonet-tube steam-reforming reactor that makes it possible to operate with pressure differences on the order of 10 MPa between the tube side and the calender side.

One drawback of these devices is that they do not comprise a system for preheating the gas to be converted before the reaction zone and for limiting the outlet temperature of the gas that is produced by the reaction. Another drawback is that the synthesis gas is evacuated at a temperature that is not very compatible with the design of a pressurized piece of equipment. Another drawback is evacuating the gas under temperature conditions for which it promotes corrosion phenomena incompatible with most of the standard stainless steels.

This invention therefore has the object of eliminating one or more drawbacks of the prior art by proposing a steam-reforming reactor-exchanger that makes it possible to bring the reagents and the synthesis gas to a temperature that is compatible with the device and thus limits the heat losses by promoting heat exchange between the reagents and the gases that are produced.

For this purpose, this invention proposes a chamber in which a chemical reaction is carried out in the presence of catalyst and reagents, comprising:

At least one catalytic tube in which an internal tube for evacuating the gas that is produced is arranged in connection with the outside, whereby the catalyst is arranged between the internal tube for evacuation and the inside surface of the catalytic tube, Means for introducing reagents located in the upper portion of the chamber, Means for introducing the catalyst that are located in the upper portion of the chamber, Means for heating the catalytic tube that are arranged in the lower portion of the chamber, and in which in its upper portion above the catalyst, the catalytic tube comprises means that promote the exchange of heat between the reagents and the gas that is produced.

In one embodiment of the invention, the means that promote the heat exchange between the reagents and the gas that is produced consist of a passage reduction tube that is placed against the inside surface of the catalytic tube so as to allow a passage for the reagents between the passage reduction tube and the internal tube for evacuation.

According to one embodiment of the invention, the thickness of the passage reduction tube is defined so that the surface of its inside wall is arranged at a distance of between 1 mm and 40 mm from the outside surface of the internal tube for evacuation.

In one embodiment of the invention, the passage reduction tube comprises a channel that connects the means for introducing the catalyst and the zone of the catalytic tube where the catalyst is arranged.

According to an embodiment of the invention, the heating means consist of a combustion chamber that comprises at its base an injector tube of air and an inflammable gas, an internal structure that is arranged in the injector tube at the junction with the chamber, a tap nozzle that is arranged in the chamber above the internal structure, a grid for distribution of the air/gas mixture that is arranged above the tap nozzle, a porous material that is arranged above the distribution grid, and a second grid above the porous material to initiate the combustion.

In one embodiment of the invention, the distribution grid has a porosity of 30%.

In another embodiment of the invention, the porous material is a cordierite monolith of 400 cpsi.

According to one embodiment of the invention, the catalytic tube is arranged in an additional tube; the distance between the outside surface of the catalytic tube and the additional tube is between 1 mm and 40 mm.

In one embodiment of the invention, a heat-insulating-type material is arranged between the additional tube and the wall of the chamber.

According to an embodiment of the invention, the chamber has a diameter of between 50 mm and 10 m.

The invention also relates to the steam-reforming process that implements the device described above as a reactor-exchanger to produce a steam-reforming reaction.

According to one embodiment of the invention, the synthesis gas is evacuated at a temperature that is less than 600° C.

According to an embodiment of the invention, the reagents are preheated to a temperature of more than 350° C.

BRIEF DESCRIPTION OF THE DRAWINGS

Other characteristics and advantages of the invention will be better understood and will become clearer from reading the description given below, by referring to the accompanying figures that are provided by way of example:

The FIGURE shows a diagrammatic view of the chamber according to the invention.

The device according to the invention that is illustrated in FIG. 1 consists of a chamber (1) into which is inserted, through the upper portion, one or more catalytic tubes (10). This tube or these tubes can be held on the upper wall of the chamber using a flange system (11), or any other system of the same type that is well-known to one skilled in the art, to allow the disassembly thereof. In general, the chamber has an elongated cylindrical shape, and its diameter is generally between 100 mm and 10 m and preferably between 300 mm and 2 m. Within the limits provided above, the diameter of the chamber is determined based on the number of catalytic tubes that it is desired to use and based on the size of the tubes that are used. In another embodiment, the number of tubes (10) is determined based on the size of the chamber (1). The catalytic tube or tubes (10) are arranged along the longitudinal axis (A) of the chamber (1). The outside diameter of these tubes (10) is in general between 20 mm and 200 mm, and preferably between 30 mm and 100 mm. It is easy for one skilled in the art to deduce the inside diameter of the catalytic tube (10) knowing that the annular distance from the catalytic zone is in general between 5 mm and 40 mm and preferably between 8 mm and 50 mm. In general, the chamber (1) according to the invention comprises at least one catalytic tube (10). According to a variant of the invention, the chamber (1) can comprise between one and several catalytic tubes (10). Whereby the number of catalytic tubes arranged in the chamber is in general defined based on the size of the tubes used and the size of the chamber (1), this number can be, for example, between 1 and 50,000 tubes, preferably between 1 and 1,000 tubes, and very preferably between 1 and 300 tubes.

A concentric internal evacuation tube (12), which makes it possible to evacuate the gas that is produced by the catalytic reaction, is arranged inside of the catalytic tube or tubes. The outside diameter of this evacuation tube (12) is in general between 5 mm and 50 mm, and preferably between 10 mm and 20 mm. The inside diameter of this evacuation tube (12) is in general between 3 mm and 40 mm, and preferably between 8 mm and 15 mm. The catalyst (13) that is necessary for the steam-reforming reaction is arranged in the annular space between the wall of the evacuation tube (12) and the wall of the catalytic tube (10). The evacuation tube (12) is used to evacuate the gas that is produced by the reaction, also called synthesis gas, at the outlet of the catalytic bed. This hot synthesis gas therefore circulates in counter-current to the reagents, which are water and the hydrocarbon- or alcohol-type reagent, in the catalytic bed. Thus, a portion of the enthalpy that is necessary to the reaction is provided by the synthesis gas that is cooled along the evacuation tube (12).

The catalyst that is used within the framework of the invention can consist of grains of various shapes (spheres, filled or machined cylinders, . . . ) or monoliths in which channels with small diameters are machined. The reagents are introduced into the catalytic tube (10) using the pipe (15). This pipe can be arranged orthogonally to the wall of the tube (10) or tangentially to provide a movement of rotation to the flow at the inlet of the catalytic tube (10) and thus to promote the distribution of the flow over the entire annular section where the catalyst (13) is located.

In its upper part, the device according to the invention comprises means for preheating reagents and cooling the synthesis gas that is produced. These means that make possible a heat exchange between the reagents and the synthesis gas are formed by a passage reduction tube (14) that is inserted into the upper portion of the catalytic tube (10) against the inside wall of the catalytic tube (10) to reduce the section for passage of the flow of reagents. This passage reduction tube (14) is cylindrical and in general has a shape that is equivalent to the one inside the catalytic tube (10) so as to adhere well to the inside wall of the catalytic tube (10). The passage reduction tube has a defined thickness so that its inside wall is arranged at a distance of in general between 1 mm and 40 mm from the outside surface of the internal evacuation tube (12), preferably between 1.5 mm and 20 mm, and very preferably is equal to 2 mm. The material that is used is well known to one skilled in the art and makes it possible for the passage reduction tube (14) to withstand the temperature and circulating gases. In general, the calculation of the thickness of the passage reduction tube (14) is done relative to the value of the outside diameter (or radius) of the evacuation tube (12) and the inside diameter (or radius) of the catalytic tube (10). For example, for a catalytic tube with an inside diameter of 35.1 mm and an evacuation tube (12) with an outside diameter of 13.7 mm, the thickness of the passage reduction tube (14) is between 2 mm and 8 mm, preferably between 6 mm and 8 mm. In this portion of the catalytic tube (10) where the passage reduction tube (14) is introduced, there is no catalyst. This passage section reduction (17) has the objective of accelerating the speeds of the flow of reagents and thus intensifying the transfer of heat between the synthesis gas and the flow of reagents. In this way, the reagents are preheated to the start-up temperature of the reaction in an optimized way since the heat losses are minimized between the preheating zone and the reaction zone. In addition, in this way, the synthesis gas is evacuated from the chamber at a moderate temperature: less than 600° C. and preferably less than 400° C. Thus, it is possible to confine the corrosion zone due to the composition of the synthesis gas ($H_2$, CO, $CO_2$) in the reactor and to limit the use of special steels that are resistant to this corrosion in the single evacuation tube (12).

For the introduction of the catalyst, the device comprises an intake tube (16) that is located on the outside wall of the catalytic tube (10) with an angle in general of between 30° and 60° relative to the longitudinal axis (A) of the device to facilitate the flow of the catalyst. The catalyst can then flow through the passage section (17) if the upper portion of the catalytic tube (10) has a system of detachable flanges and if its diameter is adequate, or the catalyst can flow via a channel (18) that is machined in the passage reduction tube (14). In this way, it is possible to load the catalyst once the evacuation tube (12) and the passage reduction tube (14) are installed. To unload the catalyst, it is possible to consider the detachment of the evacuation tube (12) by a flange system or to use the passage (18).

A burner that can be an integral part of the chamber (1) and can be maintained by a flange system for facilitating its detachment is arranged in the low portion of the chamber of the reactor. This burner consists of a combustion chamber (20) for the mixing and distributing of the air flow and the inflammable gas. An injector tube (21) is located at the base of this chamber. The air is injected through a pipe (31) that is orthogonal or tangential to the injector tube (21), and the inflammable gas is injected via a concentric tube (22). An internal structure (23) that consists of a convergent section and a divergent section is added to the upper portion of the injector tube (21) to promote the air/inflammable gas mixture. In the chamber (20), a tap-nozzle plate (24) and a distribution grid (25) are arranged one on top of the other to promote the distribution of the air/inflammable gas mixture over the entire section of the chamber (20). The tap-nozzle plate (24) is arranged above the intake of the injector tube (21), and the distribution grid (25) is therefore arranged above the tap-nozzle plate (24). A section of porous material (26) or mono-lith-type material is added above the distribution grid (25) in the chamber (20) to eliminate the risks of flames returning upstream from the burner. A second grid (27) is arranged above the porous material to initiate the combustion and to hold the flame if a flame develops. This grid may or may not be coated with a catalytic or non-catalytic material. This grid can also be replaced by a catalytic monolith section. This grid can also be arranged in the form of one or more perforated tubes so as to develop more surface area for establishing the flame. The value of the surface area of this grid (27) is in general between the value of the surface area of the section of the catalytic tube (equivalent to pi/4× its outside diameter squared) and 10× the value of the surface area of the section of the catalytic tube (10), and preferably 5× the value of the surface of the section of the catalytic tube (10). The combustion can be initiated using an ignition electrode (29) that passes through the base of the chamber (1). The gas that comes from the combustion is then channeled between the catalytic tube (10) and an additional tube (28). The space between these two tubes (10, 28) is calculated so as to optimize the heat transfer between the gas that comes from the burner and the catalytic zone. This distance takes into consideration the dimensions of the chamber (1), the catalytic zone, and the combustion chamber (20). In general, it is between 1 mm and 40 mm, preferably between 1.5 mm and 20 mm, and very preferably is equal to 2.5 mm. The very significant heat losses that can appear at these very high heat levels (>1000° C.) are reduced since the distance between the combustion zone and the exchange zone is minimized, and a heat-insulating-type material (2) is arranged between the additional tube (28) and the wall of the chamber (1). The combustion gas is then evacuated in the upper portion through a pipe (30) that passes through the chamber (1). A spiral tubular exchanger can be inserted around the upper portion of the catalytic tube (10) to evaporate one of the reagents by using the cooled combustion gas before the evacuation thereof. In this way, the heat losses in the system are also limited.

EXAMPLE OF EMBODIMENT

An ethanol steam-reforming reactor/exchanger was sized with the technology that is described in the invention. The objective is to carry out the reaction for reforming an ethanol/water mixture with a flow rate of 4.7 kg/h. The volume of catalyst is 240 cc. The desired temperature at the outlet of the catalytic zone is 750° C., and the reaction is to be started up beyond 350° C. at the inlet of the catalytic zone. The reactor comprises a catalytic tube that is heated by the gas of a catalytic burner that is supplied by a combustible gas that contains hydrogen and methane (composition summarized in Table 1). The flow rate of combustible gas is 3.4 kg/h. The combustion being catalyzed, it is possible to operate with a large excess of air. The flow rate of air is therefore calculated to obtain a gas temperature of 1100° C. at the output of the burner.

TABLE 1

| Composition of the Combustible Gas | |
| --- | --- |
| $CH_4$ (mol %) | 1.56 |
| $H_2$ (mol %) | 40.03 |
| $H_2O$ (mol %) | 10.54 |
| $CO_2$ (mol %) | 47.87 |

The diameter (k) of the chamber (1) of the reactor is 400 mm. The outside diameter (h) of the catalytic tube (10) is 42.2 mm, and the inside diameter (i) is 35.1 mm. The inside diameter (j) of the additional tube (28) is 47.2 mm. The thickness (b) of the gas flow path around the catalytic tube (10) to intensify the heat transfer between the combustion gas and the catalytic tube (10) is thus 2.5 mm. The height (c) of the catalytic zone is 1200 mm, and the distance from the catalytic annular zone is 10.7 mm. The inside diameter of the evacuation tube (12) of the synthesis gas (e) is 9.2 mm. The exchanger section of the reactor that is located upstream from the catalytic zone has 800 mm for its length (f). A passage reduction tube (14) is inserted at the periphery of the catalytic tube (10) to reduce the passage section of the ethanol+water mixture that penetrates the reactor. The diameter of this annular passage section (g) is 2 mm.

At the level of the chamber (20), the catalytic grid has a diameter (I) of 100 mm, and the distribution grid (25) whose porosity is 30% is arranged at a distance (m) of 40 mm from the tap-nozzle plate (24). The air intake tube (31) has an inside diameter (n) of 10.4 mm. The concentric gas intake tube (22) has an inside diameter (o) of between 6 and 8 mm, and the injector tube (21) has an inside diameter (p) of 17.1 mm. The internal structure (23) is arranged at a distance (q) of about 40 mm above the outlet of the injector tube (21). The section of porous material (26) is a cordierite monolith (400 cpsi).

The operation of the reactor/exchanger was simulated by taking into consideration the advance and the heat of reaction and the heat exchanges in the reactor for the geometry as described above. The temperature values obtained within the reactor are summarized in Table 2.

TABLE 2

| Temperature in ° C. Calculated along the Reagent Circuit and Along the Smoke Circuit | | | |
| --- | --- | --- | --- |
| | Ethanol + Water | Synthesis Gas | Smoke |
| Reactor Inlet | 238 | | |
| Catalytic Zone Inlet | 364 | 505 | |
| Catalytic Zone Outlet | 750 | 750 | 1100 |
| Reactor Outlet | | 400 | 501 |

The geometry of the reactor according to the invention thus makes it possible to reach the optimum equilibrium temperature for the steam-reforming reaction at the outlet of the catalytic bed by using the smoke from a catalytic burner. The exchanger section that is integrated upstream from the catalytic zone is effective since the outlet temperature of the synthesis gas is lowered to 400° C. (more corrosion by "metal dusting" downstream from the reactor) and the reagents are preheated to a temperature of more than 350° C. The geometry and the dimensions of the combustion chamber of the reactor according to the invention make possible an effective mixing of the reagents at the outlet of the injector tube (21). Likewise, the distribution of the combustible gas/air flow is homogeneous upstream from the catalytic grid.

The device according to the invention therefore offers the following advantages:

The heat losses are minimized because several functions are included in the same piece of pressurized equipment: preheating of reagents, reaction, cooling of reagents, combustion for the supply of heat, cooling of smoke.

The reagents are effectively preheated in the upper portion of the catalytic tube using the passage reduction that makes it possible to increase the exchange coefficients.

The synthesis gas yields its calories before leaving the reactor-exchanger at a temperature that is compatible with the design temperature of a pressurized piece of equipment.

The most severe range of corrosion (600-800° C.) is confined in the piece of equipment since the synthesis gas exits at a temperature of below 400° C.

A passage is kept to allow the loading of the catalyst; this passage is designed so as not to constitute a by-pass zone when the plug for loading the catalyst is re-closed.

The proposed solution can also integrate evaporation of the steam that is necessary to the reaction.

It should be obvious to one skilled in the art that this invention should not be limited to the details provided above and makes possible embodiments under numerous other specific forms without moving away from the field of application of the invention. Consequently, these embodiments are to be considered by way of illustration and can be modified without, however, going beyond the scope defined by the attached claims.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding FR application No. 08/05.537, filed Oct. 7, 2008, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A chamber in which a chemical reaction is performed in the presence of catalyst and reagents, comprising:
   At least one catalytic tube (10) comprising therein an internal evacuation tube (12) for evacuating exhaust gas to the outside, catalyst (13) being arranged between the internal evacuation tube (12) and an inside surface of the catalytic tube (10),
   Means for introducing reagents (15) located in the upper portion of the chamber (1),
   Means for introducing the catalyst (16) located in the upper portion of the chamber (1),
   Means for heating the catalytic tube (10) arranged in the lower portion of the chamber (1),
and in which the catalytic tube (10) comprises, in its upper portion above the catalyst (13), a reduced cross section of passage section (17) for the reagents for promoting heat exchange between the reagents and the resultant gas.

2. A chamber according to claim 1, in which the means that promote heat exchange between the reagents and the gas that is produced comprising a passage reduction tube (14) that is placed against the inside surface of the catalytic tube (10) so as to form said reduced cross section of the passage section (17) for the reagents between the passage reduction tube (14) and the internal evacuation tube (12).

3. A chamber according to claim 2, in which the thickness of the passage reduction tube (14) is defined so that the surface of its inside wall is arranged at a distance of between 1 mm and 40 mm from the outside surface of the internal evacuation tube (12).

4. A chamber according claim 3, in which the passage reduction tube (14) comprises a channel (18) that connects the means for introducing the catalyst (16) to the catalytic tube (10).

5. A chamber according to claim 2, in which the passage reduction tube (14) comprises a channel (18) that connects the means for introducing the catalyst (16) to the catalytic tube (10).

6. A chamber according to claim 5 comprising heating means composing a combustion chamber (20) that comprises at its base an air injector tube (21) and an inflammable gas, an internal structure (23) that is arranged in the injector tube (21) at the junction with the chamber (20), a tap nozzle (24) that is arranged in the chamber (20) above the internal structure (23), a grid (25) for distribution of the air/gas mixture that is arranged above the tap nozzle (24), a porous material (26) that is arranged above the distribution grid (25), and a second grid (37) above the porous material to initiate the combustion.

7. A chamber according to claim 5, in which the catalytic tube (10) is arranged in an additional tube (28), and the distance between the outside surface of the catalytic tube (10) and the additional tube (28) is between 1 mm and 40 mm.

8. A chamber according to claim 1 comprising heating means comprising a combustion chamber (20) that comprises at its base an air injector tube (21) and an inflammable gas, an internal structure (23) that is arranged in the injector tube (21) at the junction with the chamber (20), a tap nozzle (24) that is arranged in the chamber (20) above the internal structure (23), a grid (25) for distribution of the air/gas mixture that is arranged above the tap nozzle (24), a porous material (26) that is arranged above the distribution grid (25), and a second grid (37) above the porous material to initiate the combustion.

9. A chamber according to claim 8, in which the distribution grid (25) has a porosity of 30%.

10. A chamber according to claim 9, in which the porous material is a cordierite monolith of 400 cpsi.

11. A chamber according to claim 8, in which the catalytic tube (10) is arranged in an additional tube (28), and the distance between the outside surface of the catalytic tube (10) and the additional tube (28) is between 1 mm and 40 mm.

12. A chamber according to claim 1, in which the catalytic tube (10) is arranged in an additional tube (28), and the distance between the outside surface of the catalytic tube (10) and the additional tube (28) is between 1 mm and 40 mm.

13. A chamber according to claim 12, in which a heat-insulating material (2) is arranged between the additional tube (28) and the wall of the chamber (1).

14. A chamber according to claim 1 whose diameter is between 50 mm and 10 m.

15. A steam-reforming process comprising providing a device according to functioning as a reactor-exchanger and conducting a reforming reaction therein.

16. A process according to claim 15, in which synthesis gas is evacuated at a temperature that is less than 600° C.

17. A process according to claim 15, in which reagents are preheated to a temperature that is greater than 350° C.

* * * * *

UNITED STATES PATENT AND TRADEMARK OFFICE
CERTIFICATE OF CORRECTION

| | | |
|---|---|---|
| PATENT NO. | : 8,133,445 B2 | Page 1 of 1 |
| APPLICATION NO. | : 12/573376 | |
| DATED | : March 13, 2012 | |
| INVENTOR(S) | : Christophe Boyer et al. | |

It is certified that error appears in the above-identified patent and that said Letters Patent is hereby corrected as shown below:

Column 8, Line 58 reads: "device according to functioning as a reactor-exchanger and" should read --device according to claim 1, functioning as a reactor-exchanger and--.

Signed and Sealed this
Fifth Day of June, 2012

David J. Kappos
*Director of the United States Patent and Trademark Office*